(12) United States Patent
Kim et al.

(10) Patent No.: US 8,377,605 B2
(45) Date of Patent: Feb. 19, 2013

(54) SOLID OXIDE FUEL CELL

(75) Inventors: Young Jung Kim, Asan-Si (KR);
Dong-Teak Chung, Seongnam-Si (KR)

(73) Assignees: Mim Ceramics Co., Ltd., Asan-si (KR);
Young Jung Kim, Asan-si (KR)

( * ) Notice: Subject to any disclaimer, the term of this patent is extended or adjusted under 35 U.S.C. 154(b) by 382 days.

(21) Appl. No.: 12/514,184

(22) PCT Filed: Nov. 9, 2007

(86) PCT No.: PCT/KR2007/005648
§ 371 (c)(1),
(2), (4) Date: May 28, 2009

(87) PCT Pub. No.: WO2008/056958
PCT Pub. Date: May 15, 2008

(65) Prior Publication Data
US 2010/0035112 A1    Feb. 11, 2010

(30) Foreign Application Priority Data
Nov. 9, 2006    (KR) .................. 10-2006-0110447

(51) Int. Cl.
*H01M 8/10* (2006.01)
(52) U.S. Cl. ..................................... 429/479
(58) Field of Classification Search ............ 429/479
See application file for complete search history.

(56) References Cited

U.S. PATENT DOCUMENTS

| 4,749,632 A | 6/1988 | Flandermeyer et al. |
| 4,799,936 A | 1/1989 | Riley |
| 2002/0012825 A1 | 1/2002 | Sasahara et al. |
| 2002/0146611 A1 | 10/2002 | Kawasaki et al. |
| 2004/0241524 A1 | 12/2004 | Buechi et al. |
| 2005/0042500 A1 | 2/2005 | Mathias et al. |

FOREIGN PATENT DOCUMENTS

| DE | 2514034 A1 | 9/1976 |
| EP | 1 276 162 B1 | 6/2006 |
| JP | 2004-031158 A | 1/2004 |

(Continued)

OTHER PUBLICATIONS

Machine Translation of JP 2004-031158, obtained from the website of the Japaense Patent Office on Aug. 15, 2011.*
PCT/KR2007/005648 International Search Report.

*Primary Examiner* — Patrick Ryan
*Assistant Examiner* — Wyatt McConnell
(74) *Attorney, Agent, or Firm* — Lowe Hauptman Ham & Berner LLP

(57) ABSTRACT

A highly efficient solid oxide fuel cell having a sharply increased electrode area per volume includes a plurality of individual electric cells placed one atop another. Each of the individual electric cells includes an electrolyte block having a plurality of channels and a plurality of first passageways communicating with the channels, a cover plate attached to the electrolyte block for closing up top portions of the channels, the cover plate having a plurality of second passageways communicating with the channels, and a plurality of air electrodes and fuel electrodes alternately arranged within the channels. The solid oxide fuel cell further includes a first side plate attached to first lateral sides of the individual electric cells for closing up first lateral ends of the channels and a second side plate attached to second lateral sides of the individual electric cells for closing up second lateral ends of the channels.

4 Claims, 8 Drawing Sheets

FOREIGN PATENT DOCUMENTS

| | | |
|---|---|---|
| JP | 2004031158 A | 1/2004 |
| KR | 10-2000-0059837 A | 10/2000 |
| KR | 10-0286779 B1 | 4/2001 |
| KR | 10-0344936 Y1 | 7/2002 |

* cited by examiner

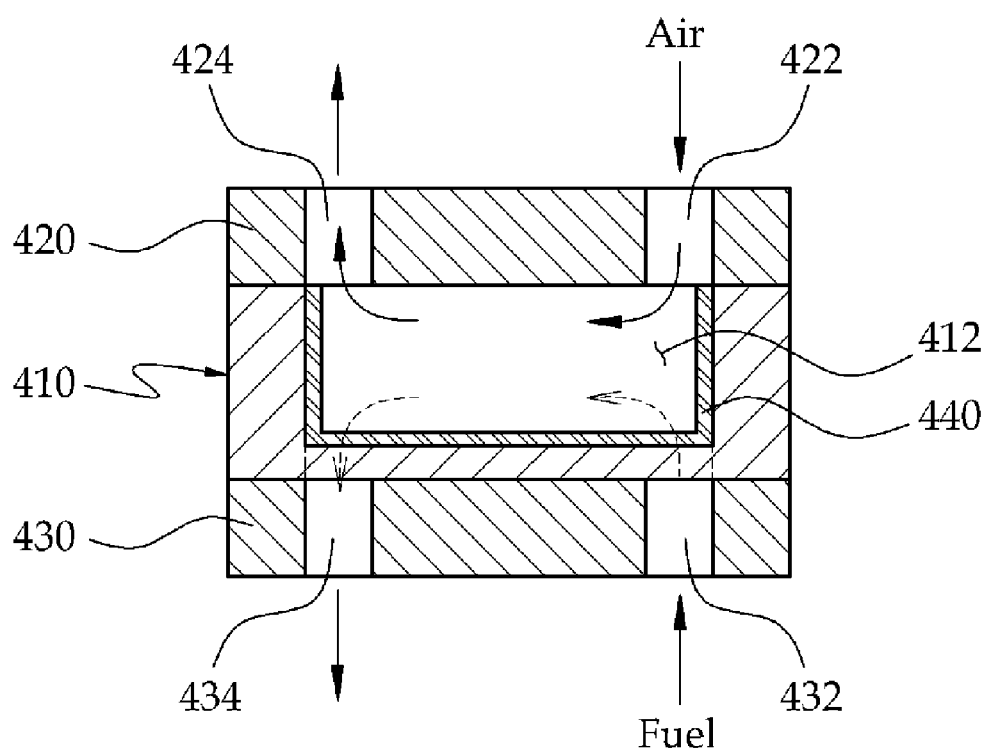
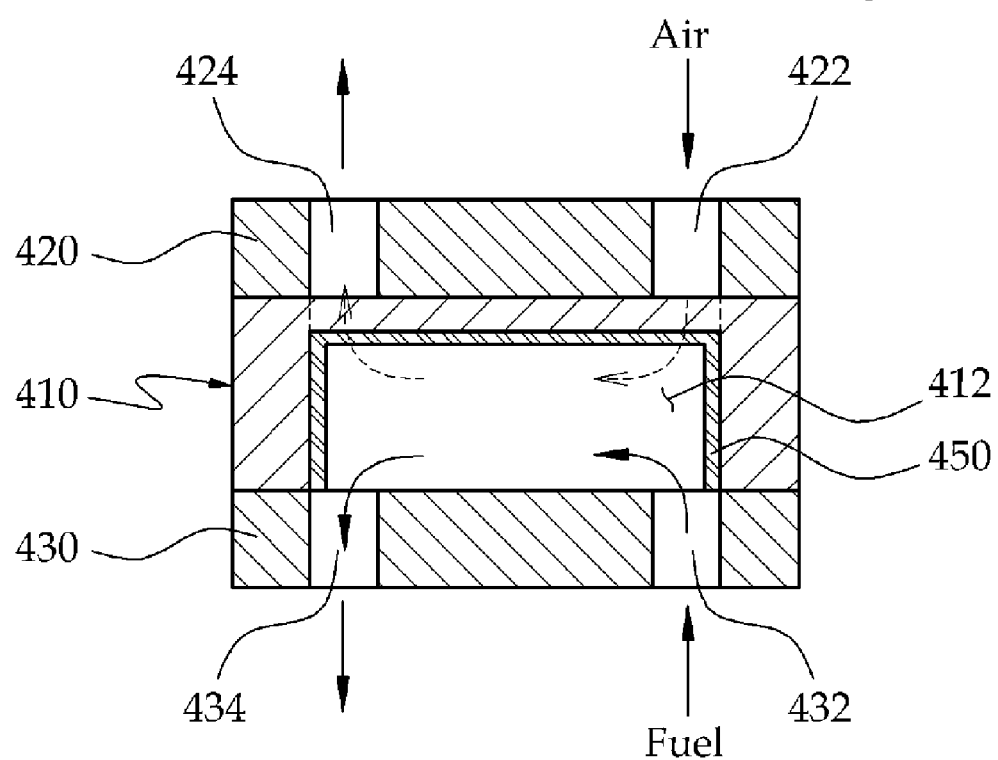

SOLID OXIDE FUEL CELL

RELATED APPLICATIONS

The present application is based on, and claims priority from, International Application PCT/KR2007/005648, filed Nov. 9, 2007 and Korean Application Number 10-2006-0110447, filed Nov. 9, 2006, the disclosures of which are hereby incorporated by reference herein in their entirety.

TECHNICAL FIELD

The present invention relates to a solid oxide fuel cell and, more particularly, to a highly efficient solid oxide fuel cell having a sharply increased electrode area per volume.

BACKGROUND ART

A fuel cell refers to a device that electrochemically induces oxidation reaction of a fuel and converts free energy generated in the oxidation reaction to electric energy. The fuel cell has been developed into various types and structures, including a phosphate fuel cell, a polymer electrolyte fuel cell, a molten carbonate fuel cell and a solid oxide fuel cell.

The solid oxide fuel cell is operated at an elevated temperature of about 600 to 1,000° C. to produce electric energy and thermal energy. Among the fuel cells developed thus far, the solid oxide fuel cell exhibits the greatest energy conversion efficiency. Owing to the increased energy conversion efficiency, the solid oxide fuel cell will be able to replace the existing energy conversion devices if it is put into practical use. Furthermore, if hydrogen is used as fuel in the solid oxide fuel cell, it becomes possible to reduce emission of carbon dioxide ($CO_2$). Thus, it is expected that the solid oxide fuel cell will be used as an energy source in the future energy systems.

In the meantime, the solid oxide fuel cell has an advantage in that it can use natural gas, coal gas or the like as well as hydrogen. This is because the solid oxide fuel cell is operated at an elevated temperature and, therefore, reaction can occur within a fuel electrode (i.e., an anode). Unlike the molten carbonate fuel cell, the solid oxide fuel cell does not use liquid electrolyte and has an advantage in that it is free from the problems of corrosion of materials, loss of electrolyte and replenishment of electrolyte. High quality waste heat dissipated from the solid oxide fuel cell can be recovered and used in combined power generation, thereby increasing the efficiency of an overall power generation system.

In principle, the solid oxide fuel cell is comprised of individual electric cells each including an oxygen ion conducting electrolyte layer, an air electrode (i.e., a cathode) and a fuel electrode, the latter two of which are arranged on the opposite surfaces of the former. If an air and a hydrogen fuel are supplied to the electrodes of the individual electric cells, reduction reaction of oxygen occurs in the air electrode to thereby generate oxygen ions. The oxygen ions are moved to the fuel electrode through the electrolyte layer and then reacted with hydrogen supplied to the fuel electrode, consequently producing water. At this time, electrons are generated in the fuel electrode and consumed in the air electrode. Thus, an electric current can be generated by interconnecting the fuel electrode and the air electrode.

In such a solid oxide fuel cell, the electrolyte layer is required to have ion conductivity great enough to permit passage of the oxygen ions therethrough. In order to reduce resistance against passage of the oxygen ions, it is also requested that the electrolyte layer be formed into a thin film having the smallest possible thickness within a range of assuring mechanical durability.

Depending on the type of a fuel cell stack, solid oxide fuel cells are largely divided into two kinds, i.e., tubular solid oxide fuel cells and planar solid oxide fuel cells. The tubular solid oxide fuel cells can be found in a large number of patent documents, including, KR10-0286779B and KR10-0344936B. The planar solid oxide fuel cells are disclosed in, e.g., KR2000-0059837A.

The planar solid oxide fuel cells may be classified into a self-standing type fuel cell and a support body type fuel cell. Individual electric cells of the self-standing type fuel cell are manufactured by coating an anode and a cathode each having a thickness of several tens micrometers on the opposite sides of an electrolyte substrate having a thickness of at least about 200 µm. Individual electric cells of the support body type fuel cell are manufactured by forming a thin electrolyte film having a thickness of about 20 µm on a porous electrode support body having a thickness of 1 to 2 mm.

However, the conventional solid oxide fuel cells including the planar ones disclosed in the above-noted patent documents suffer from a number of knotty problems in that it is difficult to reduce the thickness of the electrolyte layer and to enlarge the electrode area in an effort to assure high efficiency power generation. For example, in case the surfaces of the electrodes are coated with electrolyte and heat-treated to reduce the thickness of the electrolyte layer, an increased number of internal defects arise from the difference in thermal behaviors between the electrode material and the ion conducting material. Particularly, the electrolyte coating and heat-treatment entails a drawback that small pinholes are generated in the electrolyte layer formed on the electrode material and another drawback that the fuel makes direct contact with an air through the pinholes, consequently reducing the energy conversion efficiency. In case of co-firing the electrodes and the electrolyte layer, there is a problem in that the properties of the electrolyte layer are changed due to the reaction between the electrodes and the electrolyte layer, which leads to reduction in the ion conductivity of the electrolyte layer.

In order to increase the output power of a solid oxide fuel cell, there is a need to interconnect a plurality of individual electric cells in such a way that the resultant fuel cell stack can have a broad area. Although metal is used in connecting the individual electric cells, this poses a problem in that durability of the solid oxide fuel cell is deteriorated due to the difference in thermal expansion coefficient between the electrode constituting material, i.e., ceramic, and the cell connecting metal. In particular, a problem is posed in that the solid oxide fuel cell may possibly be broken by the thermal stress developed when the fuel cell is repeatedly activated and deactivated.

DISCLOSURE OF INVENTION

Technical Problem

In view of the afore-mentioned problems inherent in the prior art, it is an object of the present invention to provide a solid oxide fuel cell capable of greatly increasing an electrode area per volume and consequently exhibiting high efficiency by employing a structure in which channels are formed in an electrolyte block, with an air electrode and a fuel electrode arranged in each of the channels of the electrolyte block.

Another object of the present invention is to provide a solid oxide fuel cell capable of greatly improving ion conductivity, reducing ion passage resistance and sharply lowering an operation temperature by reducing the thickness of an electrolyte block.

A further object of the present invention is to provide a solid oxide fuel cell in which individual electric cells of a fuel cell stack are connected by the same kind of material so that durability and reliability can be enhanced by preventing breakage of the fuel cell stack which would otherwise be caused by a thermal stress.

A still further object of the present invention is to provide a solid oxide fuel cell that can be easily manufactured in a small size and with a reduced weight by simplifying the structure of individual electric cells and a fuel cell stack.

Technical Solution

In one aspect of the present invention, there is provided a solid oxide fuel cell, comprising: an electrolyte block including a planar base portion and a plurality of wall portions formed on a first surface of the base portion in such a manner that a plurality of channels opened at opposite lateral ends and at a top end are defined between the wall portions; a cover plate attached to the electrolyte block for closing up top portions of the channels; and a plurality of air electrodes and fuel electrodes alternately arranged within the channels for guiding the flow of an air and a fuel.

In another aspect of the present invention, there is provided a solid oxide fuel cell, comprising: a plurality of individual electric cells placed one atop another, each of the individual electric cells including an electrolyte block having a plurality of channels opened at opposite lateral ends and at a top end and a plurality of first passageways communicating with the channels, a cover plate attached to the electrolyte block for closing up top portions of the channels, the cover plate having a plurality of second passageways communicating with the channels, and a plurality of air electrodes and fuel electrodes alternately arranged within the channels for guiding the flow of an air and a fuel; a first side plate attached to first lateral sides of the individual electric cells for closing up first lateral ends of the channels; and a second side plate attached to second lateral sides of the individual electric cells for closing up second lateral ends of the channels.

In a further aspect of the present invention, there is provided a solid oxide fuel cell, comprising: an uppermost electric cell, a lowermost electric cell and at least one intermediate electric cell, each of the uppermost, lowermost and intermediate electric cells including an electrolyte block having a plurality of channels alternately closed up at first lateral ends, a cover plate attached to the electrolyte block for closing up top portions of the channels, and a plurality of air electrodes and fuel electrodes alternately arranged within the channels; a first side plate attached to a first lateral side of the intermediate electric cell for closing up the first lateral ends of the channels formed in the electrolyte block of the intermediate electric cell; and a second side plate attached to a second lateral side of the intermediate electric cell for closing up the second lateral ends of the channels formed in the electrolyte block of the intermediate electric cell, wherein a plurality of first passageways communicating with the channels is formed in a first lateral edge of the electrolyte block of each of the uppermost electric cell and the intermediate electric cell and wherein a plurality of second passageways communicating with the channels is formed in a first lateral edge of the cover plate of the intermediate electric cell.

In a still further aspect of the present invention, there is provided a solid oxide fuel cell, comprising: an uppermost electric cell, a lowermost electric cell and at least one intermediate electric cell, each of the uppermost, lowermost and intermediate electric cells including an electrolyte block having a plurality of channels alternately closed up at first lateral ends, and a plurality of air electrodes and fuel electrodes alternately arranged within the channels; a cover plate attached to a top portion of the uppermost electric cell for closing up top portions of the channels formed in the electrolyte block of the uppermost electric cell; a first side plate attached to a first lateral side of the intermediate electric cell for closing up first lateral ends of the channels formed in the electrolyte block of the intermediate electric cell; and a second side plate attached to a second lateral side of the intermediate electric cell for closing up second lateral ends of the channels formed in the electrolyte block of the intermediate electric cell, wherein a plurality of passageways communicating with the channels is formed in a first lateral end portion of the electrolyte block of each of the uppermost electric cell and the intermediate electric cell.

In a yet still further aspect of the present invention, there is provided a solid oxide fuel cell, comprising: an electrolyte block having a plurality of first channels formed on a first major surface and a plurality of second channels formed on a second major surface, the second channels interleaved with the first channels; a first cover plate attached to the first major surface of the electrolyte block for closing up the first channels, the first cover plate having first and second passageways formed along opposite lateral edges in such a manner as to communicate with opposite lateral ends of the first channels; a second cover plate attached to the second major surface of the electrolyte block for closing up the second channels, the second cover plate having third and fourth passageways formed along opposite lateral edges in such a manner as to communicate with opposite lateral ends of the second channels; a plurality of air electrodes formed in the first channels; and a plurality of fuel electrodes formed in the second channels.

Advantageous Effects

With the solid oxide fuel cell of the present invention, it is possible to greatly increase an electrode area per volume and consequently to assure high efficiency by employing a structure in which channels are formed in an electrolyte block, with an air electrode and a fuel electrode arranged in each of the channels of the electrolyte block. It is also possible to greatly improve ion conductivity, reduce ion passage resistance and sharply lower an operation temperature by reducing the thickness of an electrolyte block. Furthermore, since individual electric cells of a fuel cell stack are connected by the same kind of material, durability and reliability can be enhanced by preventing damage of the fuel cell stack which would otherwise be caused by a thermal stress. In addition, a power generation system with increased capacity can be easily realized in a small size and with a reduced weight by simplifying the structure of individual electric cells and a fuel cell stack.

BRIEF DESCRIPTION OF THE DRAWINGS

FIG. 12 is a section view taken along line XII-XII in FIG. 10.

FIG. 13 is a section view taken along line XIII-XIII in FIG. 10.

BEST MODE FOR CARRYING OUT THE INVENTION

Preferred embodiments of a solid oxide fuel cell in accordance with the present invention will now be described in detail with reference to the accompanying drawings.

Figure 1:
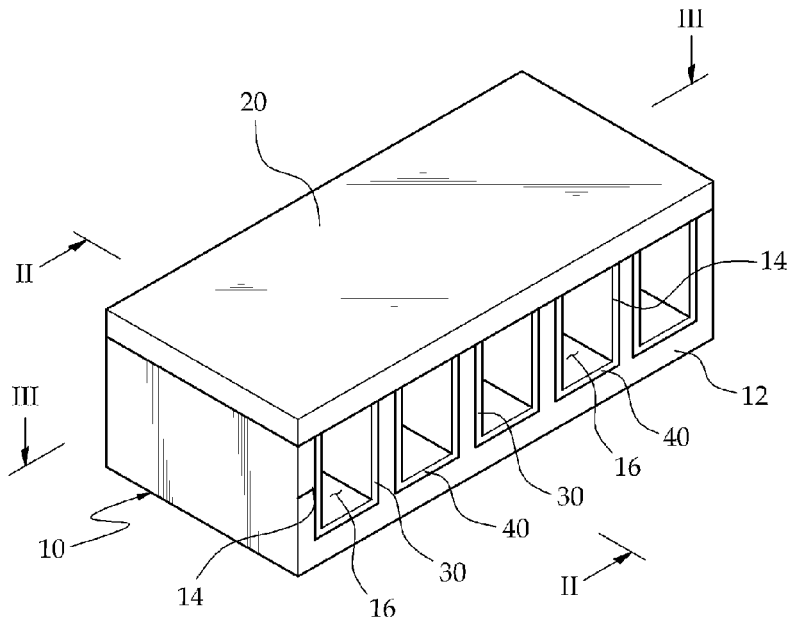
FIG. 1 is a perspective view showing a first embodiment of a solid oxide fuel cell in accordance with the present invention.
Figure 2:
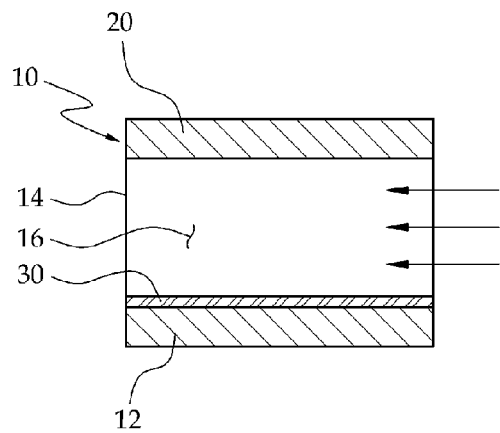
FIG. 2 is a section view taken along line II-II in FIG. 1.
Figure 3:
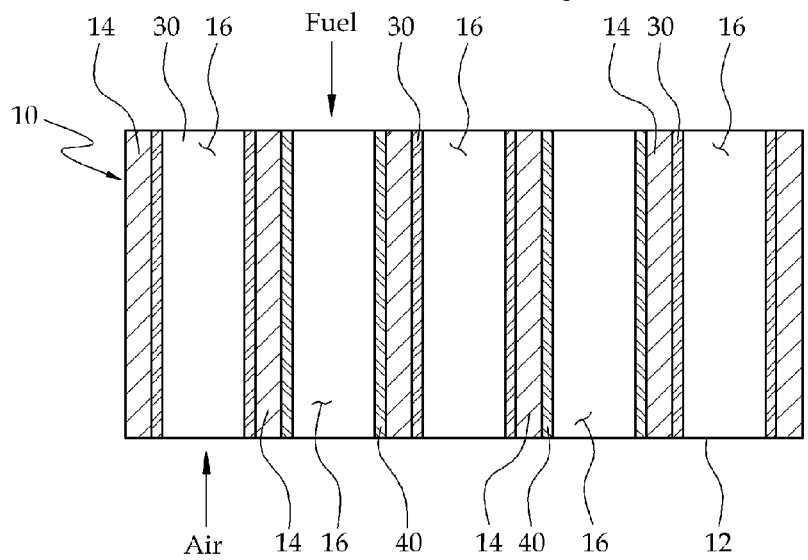
FIG. 3 is a section view taken along line III-III in FIG. 1.

Shown in FIGS. 1 through 3 is a first embodiment of a solid oxide fuel cell in accordance with the present invention. Referring to FIGS. 1 and 2, the solid oxide fuel cell of the first embodiment includes an electrolyte block 10 that may be made of an ion conducting material such as yttria-stabilized zirconia (YSZ), $CeO_2$-based electrolyte, $Bi_2O_3$-based electrolyte, $LaGaO_3$-based electrolyte or the like.

The electrolyte block 10 is comprised of a planar base portion 12 and a plurality of wall portions 14 arranged on one surface of the base portion 12 at an equal interval. A plurality of channels 16 with open lateral ends and an open top end is defined between the wall portions 14. Each of the wall portions 14 may be formed to have a thickness of several tens micrometers. Each of the channels 16 may have a depth about thirty times as great as the width thereof. As an example, if each of the wall portions 14 is manufactured to have a thickness of 50 μm, the depth thereof may be approximately 1,500 μm.

A cover plate 20 is attached to the top portion of the electrolyte block 10 in such a manner as to cover the channels 16. The cover plate 20 may be made of electrolyte just like the electrolyte block 10, glass, glass-ceramic or the like. The electrolyte block 10 and the cover plate 20 may be either directly bonded to each other under a high temperature and a high pressure or may be encapsulated by an encapsulant such as glass-ceramic or the like.

Referring collectively to FIGS. 1 through 3, air electrodes 30 and fuel electrodes 40 are alternately arranged within the channels 16. The air electrodes 30 and the fuel electrodes 40 may be formed by electrochemical vapor deposition. Alternatively, the air electrodes 30 and the fuel electrodes 40 may be coated in the form of paste. Various kinds of materials may be used in forming the air electrodes 30 and the fuel electrodes 40. As a representative example, the air electrodes 30 may be made of $LaSrMnO_3$ and the fuel electrodes 40 may be made of Ni-YSZ cermet.

As can be seen in FIG. 3, with the solid oxide fuel cell of the first embodiment as configured above, an air, i.e., oxygen ($O_2$), is supplied to the channels 16 in which the air electrodes 30 are formed, whereas a fuel, e.g., hydrogen ($H_2$), is supplied to the channels 16 in which the fuel electrodes 40 are arranged. Although it is shown in FIG. 3 that the air and the fuel flow along the air electrodes 30 and the fuel electrodes 40 in the opposite directions, the directions of flow of the air and the fuel are shown for the illustrative purpose only and may be selected arbitrarily.

Upon supply of the air, reduction reaction occurs in the air electrodes 30 to thereby generate oxygen ions. After moving to the fuel electrodes 40 through the wall portions 14 of the electrolyte block 10, the oxygen ions are reacted with hydrogen supplied to the fuel electrodes 40, thus generating water. At this time, oxygen molecules are ionized by electrons in the air electrodes 30, in which process electrons are consumed. The oxygen ions are oxidized by reaction with hydrogen in the fuel electrodes 40, in which process electrons are generated. If the air electrodes 30 and the fuel electrodes 40 are connected to each other, electrons will flow to generate an electric current. The air electrodes 30 and the fuel electrodes 40 may be connected to a bus or a current collector.

As set forth above, the solid oxide fuel cell in accordance with the first embodiment of the present invention employs a structure in which the air electrodes 30 and the fuel electrodes 40 are formed within the channels 16 of the electrolyte block 10. This helps reduce the thickness of the wall portions 14, viz., the electrolyte layer, whereby the area of the air electrodes 30 and the fuel electrodes 40 can be increased while improving ion conductivity. Accordingly, the solid oxide fuel cell in accordance with the first embodiment of the present invention is capable of performing power generation with high efficiency. Furthermore, the reduction in the thickness of the electrolyte layer leads to reduction in the ion passage resistance, thereby sharply reducing the operation temperature of the fuel cell. Therefore, the solid oxide fuel cell of the present invention can be advantageously used as a power source of portable electronic appliances and small-sized electronic devices.

Figure 4:
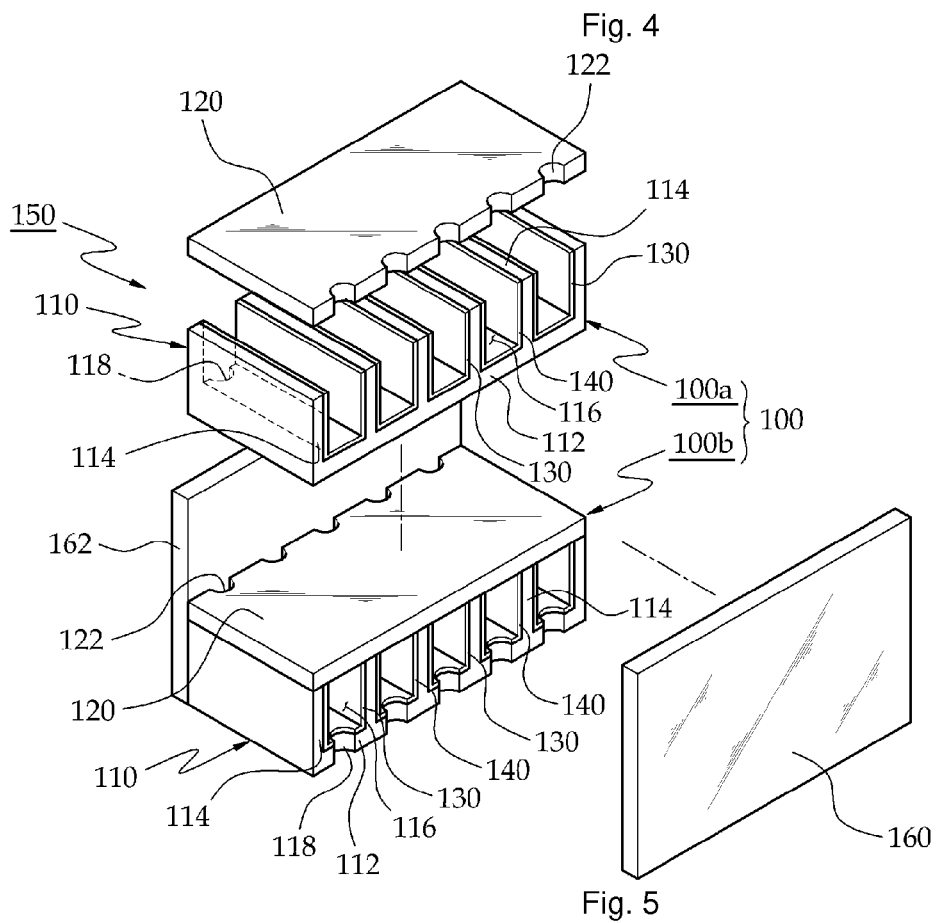
FIG. 4 is a perspective view showing a second embodiment of a solid oxide fuel cell in accordance with the present invention.
Figure 5:
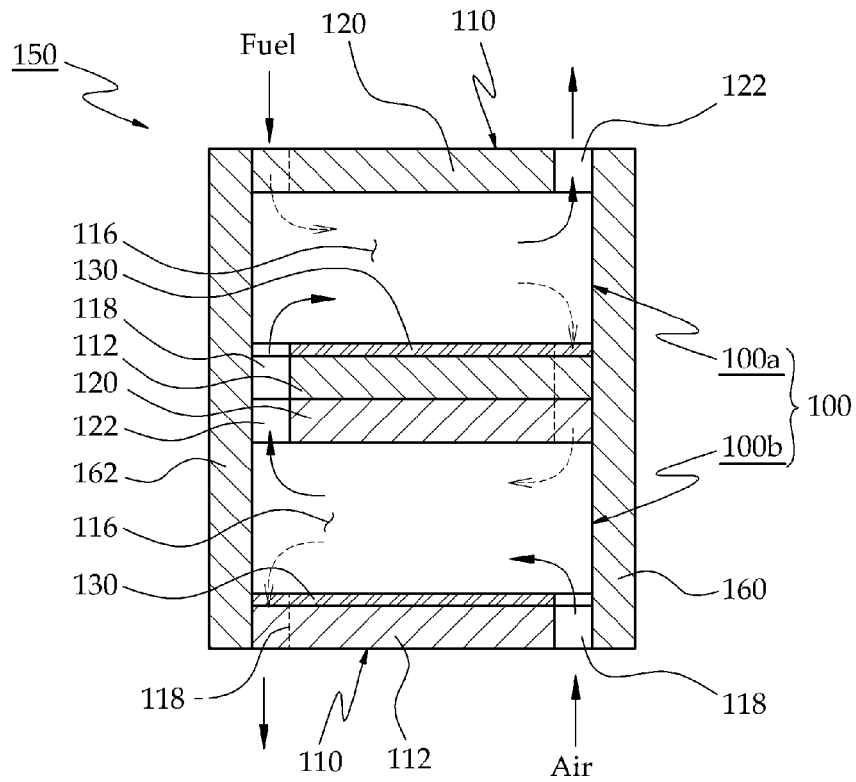
FIG. 5 is a section view illustrating the flow of air and fuel in the solid oxide fuel cell of the second embodiment of the present invention.

Shown in FIGS. 4 and 5 is a second embodiment of the solid oxide fuel cell of the present invention. Referring to FIGS. 4 and 5, the solid oxide fuel cell of the second embodiment includes a plurality of individual electric cells 100, each of which is comprised of an electrolyte block 110, a cover plate 120, air electrodes 130 and fuel electrodes 140. The electrolyte block 110 is provided with a base portion 112, wall portions 114 and channels 116. Inasmuch as the base portion 112, the wall portions 114, the channels 116, the cover plate 120, the air electrodes 130 and the fuel electrodes 140 have the same configuration as that of the corresponding components employed in the solid oxide fuel cell of the first embodiment, no description will be made in that regard.

The individual electric cells 100 are placed one atop another to form a solid oxide fuel cell stack 150. A plurality of first passageways 118 through which the channels 116 of the respective electric cells communicate with one another is formed on one side of the base portion 112 of the electrolyte block 110. Although it is shown in FIGS. 3 and 4 that the first passageways 118 is in the form of cutout grooves formed by partially cutting away one end of the base portion 112, they may be in the form of holes formed near one end of the base portion 112. Furthermore, although it is shown that the individual electric cells 100 include two electric cells, i.e., an upper electric cell 100a and a lower electric cell 100b, the number of the individual electric cells 100 may be arbitrarily increased.

The first passageways 118 formed in the base portions 112 of the upper and lower electric cells 100a and 100b are arranged in a diagonally facing relationship with each other so that the channels 116 of the upper electric cell 100a can communicate with the channels 116 of the lower electric cell 100b therethrough. A plurality of second passageways 122 that communicates with the channels 116 is formed in the diagonally opposite end of the cover plate 120 from the end of the base portion 112 having the first passageways 118. The first passageways 118 and the second passageways 122 are arranged in such a way that the air and the fuel can flow in zigzag along the air electrodes 130 and the fuel electrodes 140 of the upper and lower electric cells 100a and 100b.

A first side plate 160 and a second side plate 162 are attached to the opposite side surfaces of the fuel cell stack 150 so that they can close off the channels 116 of the individual electric cells 100. The first side plate 160 and the second side plate 162 may be made of electrolyte, glass or glass-ceramic.

In the solid oxide fuel cell of the second embodiment as configured above, an air is supplied to the channels 116 in which the air electrodes 130 are formed and a fuel, i.e., hydrogen, is supplied to the channels 116 in which the fuel electrodes 140 are formed. The air and the fuel flow in zigzag along the first passageways 118, the second passageways 122, the air electrodes 130 and the fuel electrodes 140.

Seeing that the solid oxide fuel cell stack 150 of the second embodiment is constructed by placing the individual electric cells 100 one atop another, it is possible to greatly increase the area of the air electrodes 130 and the fuel electrodes 140, i.e., the electrode area, thereby performing power generation with high efficiency. In addition, the cover plate 120 is formed of a material having no difference in thermal expansion coefficient from the electrolyte block 110 of each of the individual electric cells 100. In this case, the fuel cell stack 150 exhibits increased durability and reliability, because the individual electric cells 100 of the fuel cell stack 150 are bonded to each other by the same kind of material. Moreover, in case the cover plate 120 and the first and second side plates 160 and 162 are made of glass or glass-ceramic, the difference in thermal expansion coefficient between them and the electrolyte block 110 becomes far smaller than that available when they are made of metal. Therefore, even when repeatedly operated, the solid oxide fuel cell of the second embodiment is prevented from damage which would otherwise be caused by a thermal stress. Since the individual electric cells 100 and the fuel cell stack 150 are structurally simple, a power generation system with increased capacity can be easily realized in a small size and with a reduced weight.

Figure 6:
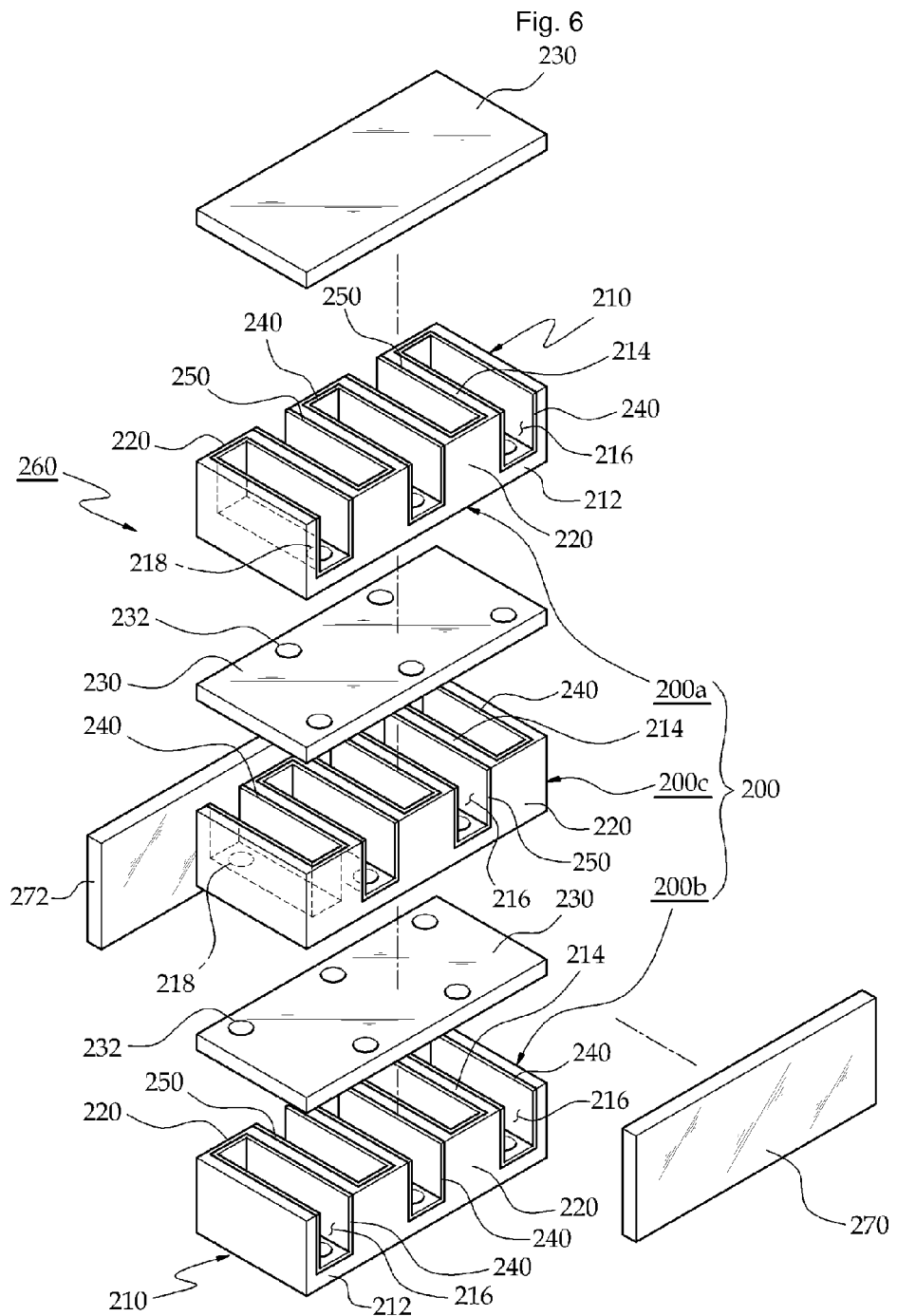
FIG. 6 is a perspective view showing a third embodiment of a solid oxide fuel cell in accordance with the present invention.
Figure 7:
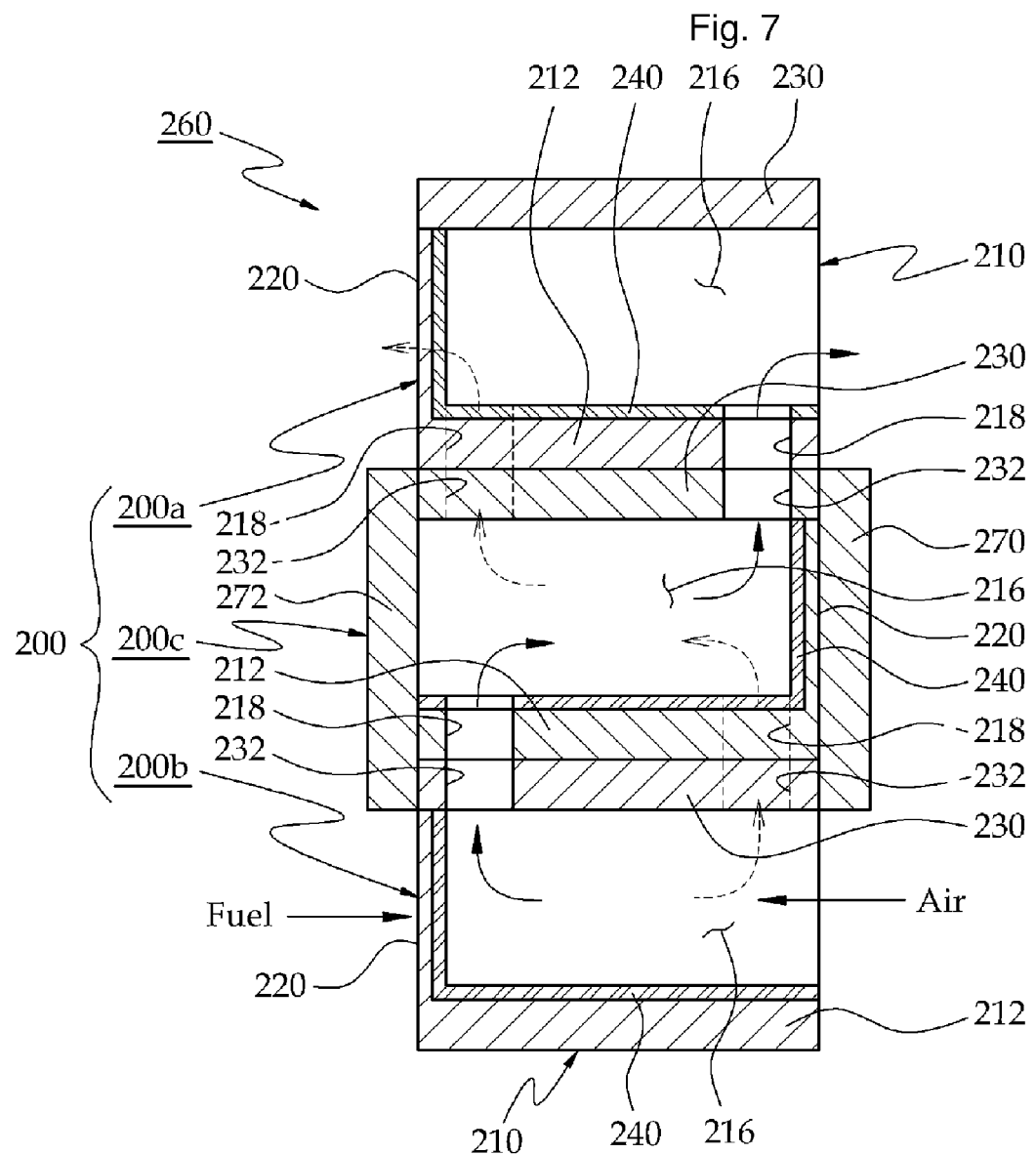
FIG. 7 is a section view illustrating the flow of air and fuel in the solid oxide fuel cell of the third embodiment of the present invention.

Shown in FIGS. 6 and 7 is a third embodiment of the solid oxide fuel cell of the present invention. Referring to FIGS. 6 and 7, the solid oxide fuel cell of the third embodiment includes a plurality of individual electric cells 200, each of which is comprised of an electrolyte block 210, a cover plate 230, air electrodes 240 and fuel electrodes 250. The electrolyte block 210 is provided with a base portion 212, wall portions 214 and channels 216. Inasmuch as the base portion 212, the wall portions 214, the channels 216, the cover plate 230, the air electrodes 240 and the fuel electrodes 250 have the same configuration as that of the corresponding components employed in the solid oxide fuel cell of the first embodiment, no description will be made in that regard.

Two neighboring wall portions 214 of the electrolyte block 210 are connected at one side by a side wall portion 220 in such a fashion that the channels 216 can be alternately closed off at the opposite sides. In other words, the wall portions 214 are connected in zigzag at their opposite sides by means of the alternately arranged side wall portions 220, thereby closing off one side of each of the channels 216 in an alternating manner.

The individual electric cells 200 are placed one atop another to form a solid oxide fuel cell stack 260. The individual electric cells 200 includes an uppermost electric cell 200a, a lowermost electric cell 200b and at least one intermediate electric cell 200c arranged between the uppermost electric cell 200a and the lowermost electric cell 200b. By way of example, it is shown in FIGS. 6 and 7 that only one intermediate electric cell 200c is arranged between the uppermost and lowermost electric cells 200a and 200b.

First passageways 218 are formed in the base portions 212 of the uppermost electric cell 200a and the intermediate electric cell 200c in the opposite positions from the side wall portions 220 and in a diagonally facing relationship with each other. Second passageways 232 that communicate with the channels 216 are formed in the diagonally opposite end of the cover plate 230 of the intermediate electric cell 200c from the end of the base portion 212 having the first passageways 218. The first passageways 218 and the second passageways 232 are arranged in such a way that the air and the fuel can flow in zigzag along the air electrodes 240 and the fuel electrodes 250 of the lowermost electric cell 200b and the intermediate electric cell 200c. Although it is shown in FIGS. 6 and 7 that the first passageways 218 and the second passageways 232 are in the form of holes, they may be cutout grooves formed by partially cutting away one side portions of the base portion 212 and the cover plate 230.

A first side plate 270 and a second side plate 272 are attached to the opposite side surfaces of the fuel cell stack 260 so that they can close up the channels 216 of the intermediate electric cell 200c. The first and second side plates 270 and 272 may be made of electrolyte, glass or glass-ceramic.

In the solid oxide fuel cell of the third embodiment as configured above, an air is supplied to the channels 216 in which the air electrodes 240 are formed and a fuel, i.e., hydrogen, is supplied to the channels 216 in which the fuel electrodes 250 are formed. The air and the fuel flow in zigzag along the first passageways 218, the second passageways 232, the air electrodes 240 and the fuel electrodes 250. Although it is shown in FIG. 7 that the air and the fuel are supplied through the channels 216 of the lowermost electric cell 200b, they may be fed through the channels 216 of the uppermost electric cell 200a. In this case, the first passageways 218 need to be eliminated from the lowermost electric cell 200b and, instead, formed in the base portion 212 of the uppermost electric cell 200a.

Seeing that the solid oxide fuel cell stack 260 of the third embodiment is constructed by placing the individual electric cells 200 one atop another, it is possible to greatly increase the electrode area, thereby performing power generation with high efficiency and improving durability and reliability as is the case in the second embodiment. Since the individual electric cells 200 and the fuel cell stack 260 are structurally simple, a power generation system with increased capacity can be easily realized in a small size and with a reduced weight.

Figure 8:
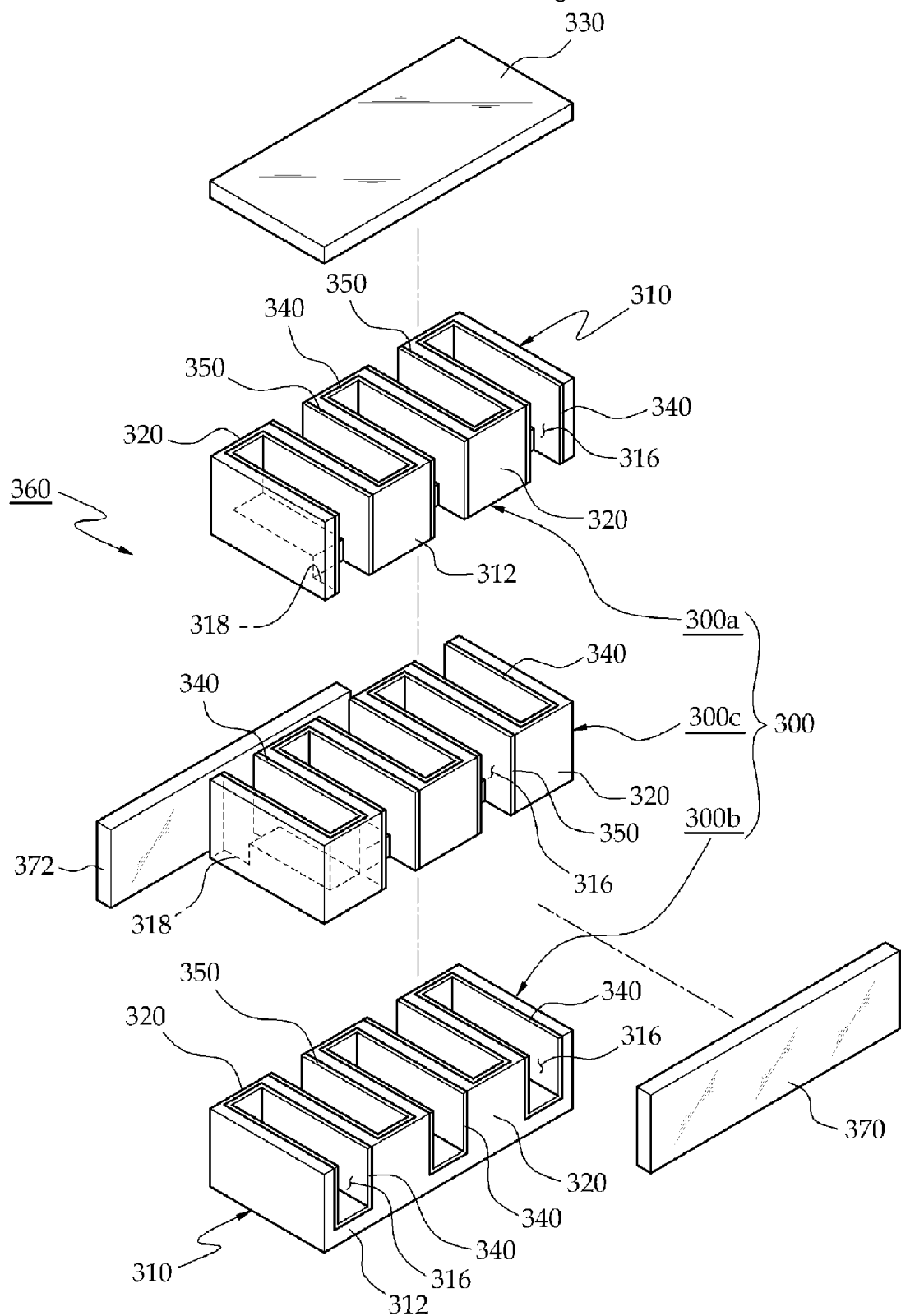
FIG. 8 is a perspective view showing a fourth embodiment of a solid oxide fuel cell in accordance with the present invention.
Figure 9:
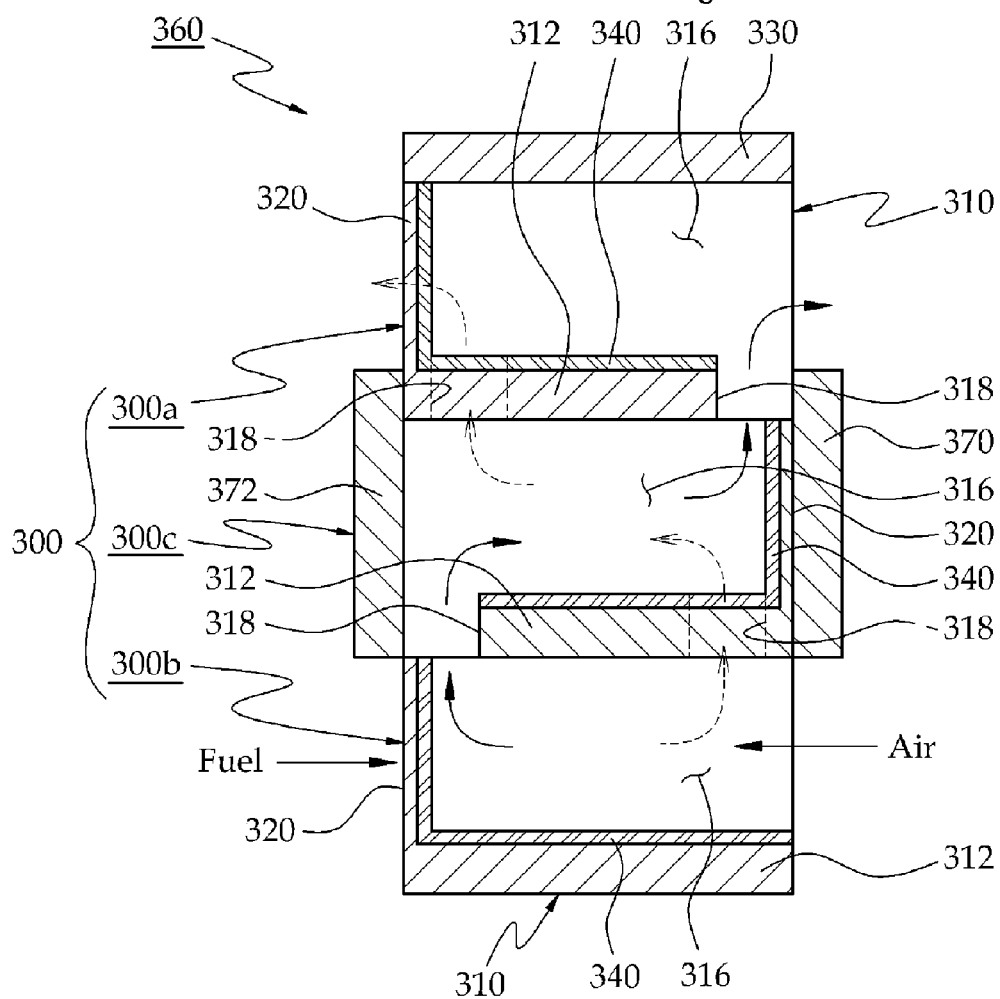
FIG. 9 is a section view illustrating the flow of air and fuel in the solid oxide fuel cell of the fourth embodiment of the present invention.
Figure 10:
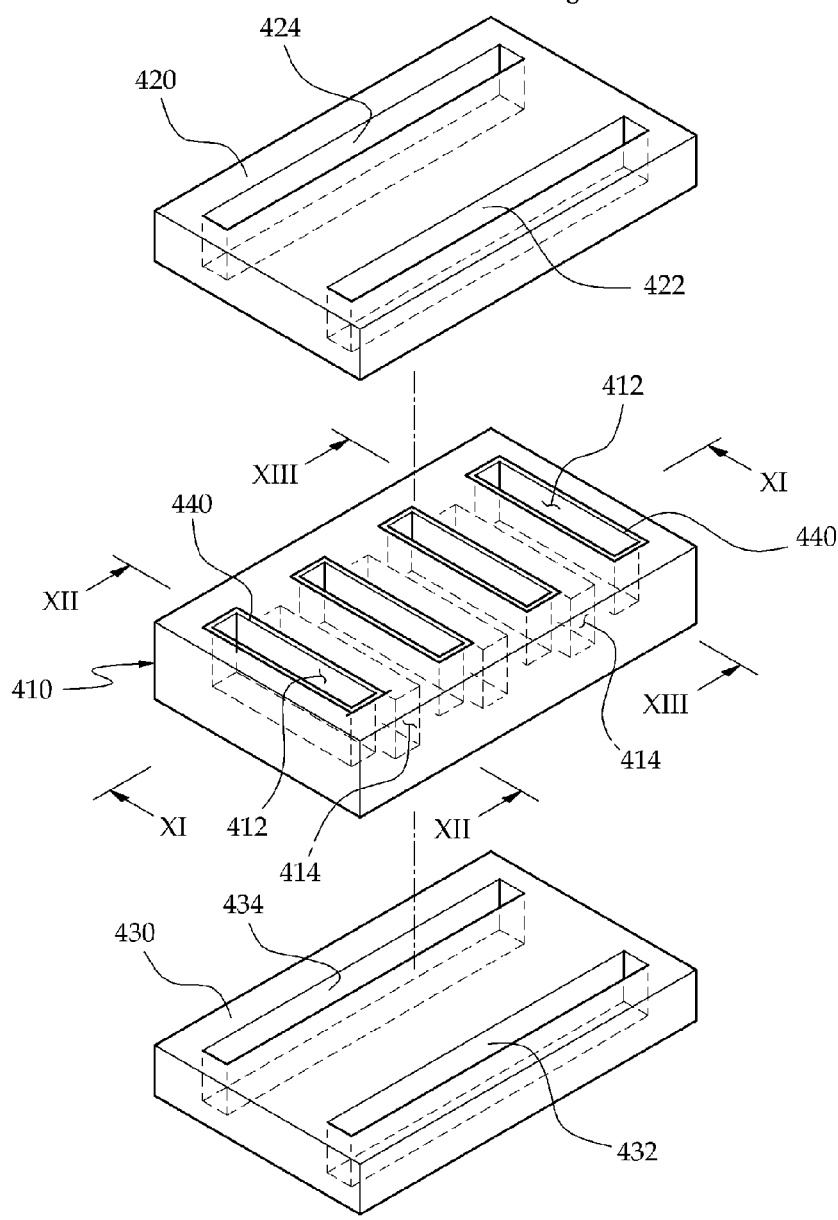
FIG. 10 is a perspective view showing a fifth embodiment of a solid oxide fuel cell in accordance with the present invention.

Shown in FIGS. 8 and 9 is a fourth embodiment of the solid oxide fuel cell of the present invention. Referring to FIGS. 8 and 9, the solid oxide fuel cell of the fourth embodiment includes a plurality of individual electric cells 300, each of which is comprised of an electrolyte block 310, air electrodes 340 and fuel electrodes 350. The electrolyte block 310 is provided with a base portion 312, wall portions 314 and channels 316. Inasmuch as the base portion 312, the wall portions 314, the channels 316, the air electrodes 340 and the fuel electrodes 350 have the same configuration as that of the corresponding components employed in the solid oxide fuel cell of the first embodiment, no description will be made in that regard.

Two neighboring wall portions 314 of the electrolyte block 310 are connected at one side by a side wall portion 320 in such a fashion that the channels 316 can be alternately closed off at the opposite sides. In other words, the wall portions 314 are connected in zigzag at their opposite sides by means of the alternately arranged side wall portions 320, thereby closing off one side of each of the channels 316 in an alternating manner.

The individual electric cells 300 are placed one atop another to form a solid oxide fuel cell stack 360. The individual electric cells 300 includes an uppermost electric cell 300a, a lowermost electric cell 300b and at least one intermediate electric cell 300c arranged between the uppermost electric cell 300a and the lowermost electric cell 300b. By way of example, it is shown in FIGS. 8 and 9 that only one intermediate electric cell 300c is arranged between the uppermost and lowermost electric cells 300a and 300b.

Passageways 318 are formed in the base portions 312 of the uppermost electric cell 300a and the intermediate electric cell 300c in the opposite positions from the side wall portions 320 and in a diagonally facing relationship with each other. The passageways 318 are arranged in such a way that the air and the fuel can flow in zigzag along the air electrodes 340 and the fuel electrodes 350 of the uppermost electric cell 300a, the lowermost electric cell 300b and the intermediate electric cell 300c. Although it is shown in FIGS. 8 and 9 that the passageways 318 are in the form of cutout grooves formed by partially cutting away one side portions of the base portions 312, they may be in the form of holes formed in one side portions of the base portions 312.

A cover plate 330 is attached to the top surface of the uppermost electric cell 300a so that it can close off the top ends of the channels 316. A first side plate 370 and a second side plate 372 are attached to the opposite side surfaces of the fuel cell stack 360 so that they can close up the channels 316 of the intermediate electric cell 300c.

The first and second side plates 370 and 372 may be made of electrolyte, glass or glass-ceramic.

In the solid oxide fuel cell of the fourth embodiment as configured above, an air is supplied to the channels 316 in which the air electrodes 340 are formed and a fuel, i.e., hydrogen, is supplied to the channels 316 in which the fuel electrodes 350 are formed. The air and the fuel flow in zigzag along the passageways 318, the air electrodes 340 and the fuel electrodes 350. The single cover plate 330 is attached to only the top surface of the uppermost electric cell 300a in the solid oxide fuel cell of the fourth embodiment. Therefore, the solid oxide fuel cell of the fourth embodiment is structurally simpler than the solid oxide fuel cell of the third embodiment in which the cover plates 230 are attached to the individual electric cells 200.

Figure 11:
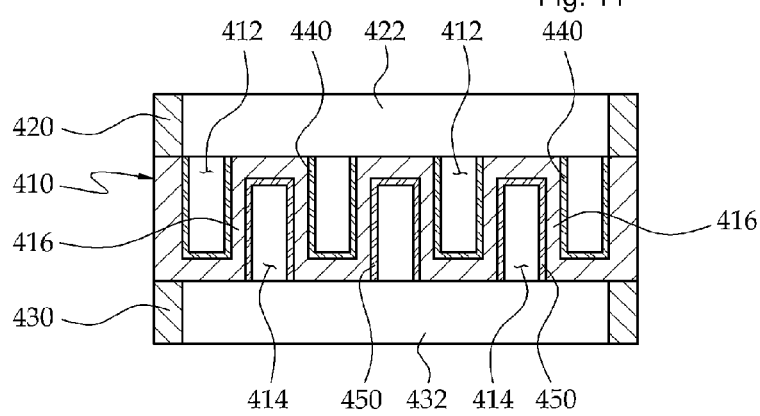
FIG. 11 is a section view taken along line XI-XI in FIG. 10.

Shown in FIGS. 10 to 13 is a fifth embodiment of the solid oxide fuel cell of the present invention. Referring to FIGS. 10 through 13, the solid oxide fuel cell of the fifth embodiment includes an electrolyte block 410 having a plurality of first channels 412 formed on one major surface thereof and a plurality of second channels 414 formed on the other major surface thereof. The second channels 414 are formed as if they are interleaved with first channels 412. The first channels 412 and the second channels 414 are divided by wall portions 416 whose thickness is several tens micrometers. As best shown in FIG. 11, the first channels 412 and the second channels 414 are alternately formed on the opposite major surfaces of the electrolyte block 410 so that the electrolyte block 410 has a zigzag-like cross section.

A first cover plate 420 is attached to one major surface of the electrolyte block 410 to close up the first channels 412, and a second cover plate 430 is attached to the other major surface of the electrolyte block 410 to close up the second channels 414. A first passageway 422 and a second passageway 424 are formed along lateral edges of the first cover plate 420 so that they can communicate with the corresponding lateral ends of the first channels 412. A third passageway 432 and a fourth passageway 434 are formed along lateral edges of the second cover plate 430 so that they can communicate with the corresponding lateral ends of the second channels 414. Just like the electrolyte block 410, the first and second cover plates 420 and 430 may be made of electrolyte, glass, glass-ceramic or the like.

Air electrodes 440 are formed within the first channels 412 so that they can make contact with an air flowing through the first channels 412. Fuel electrodes 450 are formed within the second channels 414 so that they can make contact with a fuel flowing through the second channels 414. Alternatively, the air electrodes 440 may be formed within the second channels 414 and the fuel electrodes 450 may be formed within the first channels 412.

An operation of the solid oxide fuel cell of the fifth embodiment as configured above will be described with reference to FIGS. 12 and 13. An air is supplied through the first passageway 422 of the first cover plate 420 and then distributed to one lateral ends of the first channels 412. After flowing along the first channels 412, the air is discharged through the second passageway 424. A fuel is supplied through the third passageway 432 of the second cover plate 430 and then distributed to one lateral ends of the second channels 414. After flowing along the second channels 414, the fuel is discharged through the fourth passageway 434.

The solid oxide fuel cell of the fifth embodiment is capable of simultaneously supplying the air and the fuel to the first and second channels 412 and 414 from the opposite major surfaces of the electrolyte block 410 through the first and second passageways 422 and 424 of the first cover plate 420 and through the third and fourth passageways 432 and 434 of the second cover plate 430. This makes it possible to easily perform the control of supplying and recovering the air and the fuel.

The embodiments set forth hereinabove have been presented for illustrative purpose only and, therefore, the present invention is not limited to these embodiments. It will be understood by those skilled in the art that various changes and modifications may be made without departing from the scope of the invention defined in the claims.

MODE FOR THE INVENTION

The solid oxide fuel cell of the present invention can be utilized in electrochemically converting a fuel such as hydrogen or the like to electric energy which may be used to propel mobile objects, e.g., automotive vehicles.

The invention claimed is:
1. A solid oxide fuel cell, comprising:
an uppermost electric cell, a lowermost electric cell and an intermediate electric cell, wherein the intermediate electric cell is between the lowermost electric cell and the uppermost electric cell, and wherein the uppermost electric cell, the lowermost electric cell, and at least one intermediate electric cell are stacked, each of the uppermost, lowermost and intermediate electric cells including an electrolyte block having a plurality of channels, a cover plate attached to the electrolyte block for closing up top portions of the channels, and a plurality of air electrodes and fuel electrodes alternately arranged within the channels;

a first side plate attached to a first lateral side of the intermediate electric cell for closing up the first lateral ends of the channels formed in the electrolyte block of the intermediate electric cell; and a second side plate attached to a second lateral side of the intermediate electric cell for closing up second lateral ends of the channels formed in the electrolyte block of the intermediate electric cell, wherein a first channel in the uppermost electric cell, a first channel in the intermediate electric cell, and a first channel in the lowermost electric cell are configured to allow air to flow through a first through hole in the bottom of the electrolyte block of the uppermost electric cell, a first through hole in the bottom of the electrolyte block of the intermediate electric cell, a first through hole in the cover plate of the lowermost electric cell and a first through hole in the cover plate of the intermediate electric cell, wherein the first through hole in the bottom of the electrolyte block of the uppermost electric cell and the first through hole in the cover plate of the intermediate electric cell form a first passageway from the first channel of the uppermost electric cell to the first channel of the intermediate electric cell; and wherein a second channel in the uppermost electric cell, a second channel in the intermediate electric cell, and a second channel in the lowermost electric cell are configured to allow fuel to flow through a second through hole in the bottom of the electrolyte block of the uppermost electric cell, through a second through hole in the bottom of the intermediate electric cell, through a second through hole in the cover plate of the lowermost electric cell and through a second through hole in the cover plate of the intermediate electric cell, wherein the second through hole in the bottom of the electrolyte block of the uppermost electric cell and the second through hole in the cover plate of the intermediate electric cell form a second passageway from the second channel in the uppermost electric cell to the second channel in the intermediate electric cell.

2. The solid oxide fuel cell as recited in claim 1, wherein the cover plate, the first side plate and the second side plate are made of electrolyte.

3. A solid oxide fuel cell, comprising:

an uppermost electric cell, a lowermost electric cell and an intermediate electric cell, wherein the intermediate electric cell is between the lowermost electric cell and the uppermost electric cell, and wherein the uppermost electric cell, the lowermost electric cell, and at least one intermediate electric cell are stacked, each of the uppermost, lowermost and intermediate electric cells including an electrolyte block having a plurality of channels, and a plurality of air electrodes and fuel electrodes alternately arranged within the channels;

a cover plate attached to a top portion of the uppermost electric cell for closing up top portions of the channels formed in the electrolyte block of the uppermost electric cell;

a first side plate attached to a first lateral side of the intermediate electric cell for closing up first lateral ends of the channels formed in the electrolyte block of the intermediate electric cell; and a second side plate attached to a second lateral side of the intermediate electric cell for closing up second lateral ends of the channels formed in the electrolyte block of the intermediate electric cell, wherein a first channel in the uppermost electric cell, a first channel in the intermediate electric cell, and a first channel in the lowermost electric cell are configured to allow air to flow through a first through hole in the bottom of the electrolyte block of the uppermost electric cell, a first through hole in the bottom of the electrolyte block of the intermediate electric cell, wherein the first through hole in the bottom of the electrolyte block of the uppermost electric cell forms a first passageway from the first channel of the uppermost electric cell to the first channel of the intermediate electric cell; and wherein a second channel in the uppermost electric cell, a second channel in the intermediate electric cell, and a second channel in the lowermost electric cell are configured to allow fuel to flow through a second through hole in the bottom of the electrolyte block of the uppermost electric cell, a second through hole in the bottom of the intermediate electric cell, wherein the second through hole in the bottom of the electrolyte block of the uppermost electric cell forms a second passageway from the second channel in the uppermost electric cell to the second channel in the intermediate electric cell.

4. The solid oxide fuel cell as recited in claim 3, wherein the cover plate, the first side plate and the second side plate are made of electrolyte.

* * * * *